US006781701B1

(12) United States Patent
Sweetser et al.

(10) Patent No.: US 6,781,701 B1
(45) Date of Patent: Aug. 24, 2004

(54) METHOD AND APPARATUS FOR MEASURING OPTICAL PHASE AND AMPLITUDE

(75) Inventors: John N. Sweetser, San Jose, CA (US); Anders Grunnet-Jepsen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 10/116,794

(22) Filed: Apr. 5, 2002

Related U.S. Application Data (60) Provisional application No. 60/282,961, filed on Apr. 10, 2001.

(51) Int. Cl.[7] .................................................. G01B 9/02
(52) U.S. Cl. ........................................ 356/521; 356/515
(58) Field of Search .............................. 356/521, 512, 356/515

(56) References Cited

U.S. PATENT DOCUMENTS 3,829,219 A  *  8/1974  Wyant ......................... 356/489

\* cited by examiner

*Primary Examiner*—Samuel A. Turner
*Assistant Examiner*—Patrick J Connolly
(74) *Attorney, Agent, or Firm*—Blakely, Sokoloff, Taylor & Zafman LLP (57) ABSTRACT

A method, apparatus, and system for measuring optical phase and amplitude properties of an output optical field to characterize diffractive, refractive, and other optical elements to estimate, measure, and characterize an optical transfer function are disclosed herein. In a representative embodiment, a light source may generate an optical field incident to an optical element, such as a diffraction grating. An aperture plate may be positioned relative to the optical element to allow translation of at least one of the aperture plate or the optical element in a plane transverse to a surface normal of the optical element, resulting in an output optical field having spatially dependant amplitude and phase characteristics related to a position on the optical element and to the optical field incident to the optical element. The output optical field may then be detected and analyzed to characterize the optical transfer function of the optical element.

29 Claims, 4 Drawing Sheets

METHOD AND APPARATUS FOR MEASURING OPTICAL PHASE AND AMPLITUDE

CROSS-REFERENCE TO RELATED APPLICATION

This application is related to co-pending provisional application serial No. 60/282,961, filed Apr. 10, 2001, and titled OPTICAL PHASE AND AMPLITUDE MEASUREMENT DEVICE. The benefit of the filing date of the above-identified application is hereby claimed pursuant to 35 U.S.C. §119(e)(1).

TECHNICAL FIELD

This disclosure relates generally to diffractive optical elements, and more particularly, but not exclusively, to a method, apparatus, and system for measuring optical phase and amplitude properties of a diffractive optical element that may be used in the production of Bragg gratings in optical waveguides.

BACKGROUND INFORMATION

Diffraction gratings and other diffractive optical devices have been developed for many applications. For example, diffraction gratings have been suggested for use in data routing in conjunction with optical communication systems. Fiber Bragg gratings ("FBGs") have been developed for applications including wavelength selection and routing in optical communications, as well as other applications in optical sensors and in optical remote sensing.

Current methods of producing diffraction gratings may be based on holographic techniques, and FBGs may be made by exposing an optical fiber to an interference pattern produced with optical radiation at wavelengths that produce changes in the refractive index of a fiber. In one method, a mask, configured to provide a selected interference pattern, may be provided. Ultraviolet radiation at wavelengths that are typically between about 150 nm and about 400 nm may then be directed toward the mask and a fiber, in which a FBG is to be formed, may be placed in the interference pattern. The fiber may be exposed to the interference pattern for a time period sufficient to produce index of refraction changes of a selected magnitude and in a spatial pattern corresponding to the interference pattern.

While current methods for producing FBGs using masks can be simple to implement and have adequate manufacturing throughput, the properties of the resulting FBGs depend on the properties of mask used to produce the interference pattern. Such masks and other diffractive structures may be characterized with two beam interferometric methods in which an optical field produced by light transmitted through the mask is interfered with a reference plane wave. The resulting interference pattern may then be analyzed to provide phase information about the phase of the transmitted optical field. However, such methods have significant disadvantages. It is generally desirable to measure the transmitted phase front in the near field at distances from the diffractive structure that range from a few micrometers to a few millimeters. Configuring two beam interferometers for measurements at such near field distances is difficult. In addition, two beam interferometric methods generally require ultra-stable environments to eliminate phase noise due to mechanical vibrations or variations in refractive indices experienced by either an optical signal field (i.e., the optical field produced by the diffractive structure under test) or the reference optical field.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of a method, apparatus, and system for measuring optical phase and amplitude properties are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a method, apparatus, and system for characterizing diffractive, refractive, and other optical elements to estimate, measure, and/or characterize an optical transfer function. The optical transfer function pertains to amplitude and phase contributions to an optical field produced by the optical element as a function of the angles at which an input optical field is directed to the optical element. In addition, the optical transfer function determines an angle or angles at which the output optical field propagates, and is generally a function of position on the optical element and the angle of incidence of the input optical field. In a representative example, the method, apparatus, and system may be configured for the characterization of the spatial dependence of the amplitude and phase (i.e., the optical transfer function) of transmissive or reflective diffraction gratings.

For convenience, embodiments of the method, apparatus, and system of the present invention are described herein with reference to characterization of representative optical elements such as planar diffraction gratings and segmented diffraction gratings. It will be appreciated however that the example method, apparatus, and system described herein may be modified in arrangement and detail for the characterization of arbitrary diffractive, refractive, catadioptric, holographic, or other optical elements. Other features of the illustrated embodiments will be apparent to the reader from the foregoing and the appended claims, and as the detailed description and discussion is read in conjunction with the accompanying drawings.

Figure 1A:
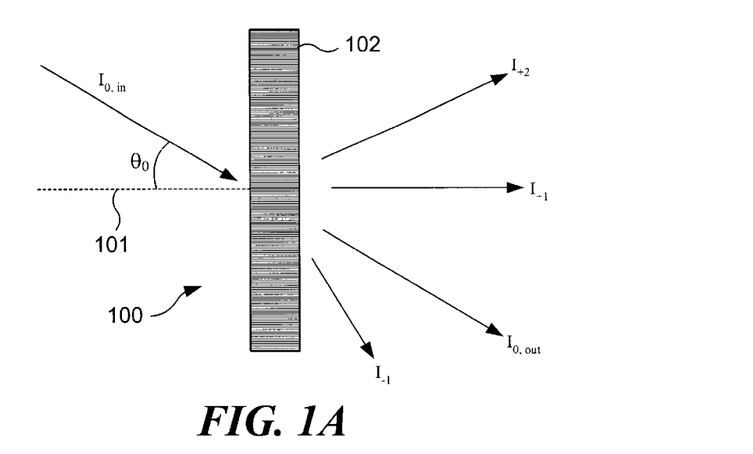
FIG. 1A is a schematic diagram illustrating diffraction of an input optical field by a grooved diffraction grating in accordance with an embodiment of the present invention.

With reference now to the drawings, and in particular to FIG. 1A, a schematic diagram illustrating an embodiment of a planar diffraction grating 100, including a series of periodic parallel grooves 102, is shown in accordance with an embodiment of the present invention. The grooves 102 may be defined by a spatial orientation and a groove profile that may be configured to have a variety of shapes determined by a corresponding function, or the like, in an embodiment. For example, groove profiles may be sinusoidal, producing a periodic sinusoidal groove pattern. In other embodiments, the groove profiles may be determined by a "top-hat" (square) function, resulting in a lamellar grating profile, or a saw-tooth function, resulting in a so-called "blazed grating."

In one embodiment, the grating 100 may be a transmission diffraction grating and may be defined by, for example, a periodic, linear arrangement of parallel grooves 102. An optical field, such as a uniform plane wave, incident to such a grating (e.g., the grating 100), may be diffracted into one or more output directions, in an embodiment. For example, FIG. 1A illustrates an input optical field $I_{o,in}$ that may be diffracted into an output optical field that includes +2, +1, 0, −1 diffraction orders $I_{+2}$, $I_{+1}$, $I_{0, out}$, and $L_1$, respectively. It will be appreciate that while other diffraction orders may also be produced, they are not illustrated in FIG. 1A for purposes of clarity. In one embodiment, the grating 100 may be typical of a diffraction grating in which the grooves 102 are defined by periodic spatial variations in optical transmittance or reflectance.

Figure 1B:
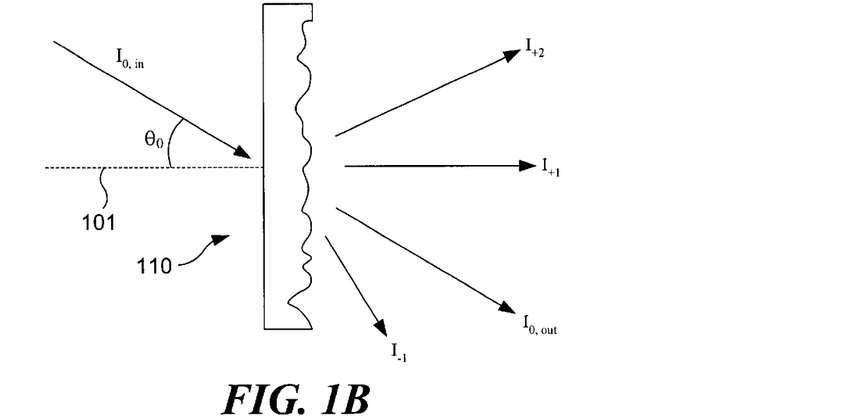
FIG. 1B is a schematic diagram illustrating diffraction of an input optical field by a diffractive structure that includes a transmissive optical material having a spatially varying optical thickness in accordance with an embodiment of the present invention.

With reference now primarily to FIG. 1B, a schematic diagram illustrating a transmissive grating 110 having a spatially varying thickness is shown in accordance with an embodiment of the present invention. The grating 110 may also include a spatially varying absorption, in an embodiment. The grating 110 may diffract (and/or refract) an input optical field $L_{o,in}$, in an embodiment, into an output optical field that includes components $I_{+2}$, $I_{+1}$, $I_{0, out}$, and $L_1$ corresponding to +2, +1, 0, and −1 diffraction orders, respectively. As with FIG. 1A, components corresponding to additional diffraction orders are not shown in FIG. 1B for purposes of clarity, but may be present in accordance with embodiments of the invention.

In one embodiment, the optical element (e.g., diffractive structures) may also include two-dimensional or three-dimensional variations in optical phase or optical transmittance. For example, combinations of two or more arbitrary functions may be used to define variations in substrate thickness, locations of grooves, or spatial variation of optical absorption or optical gain along orthogonal or non-parallel axes.

Figure 1C:
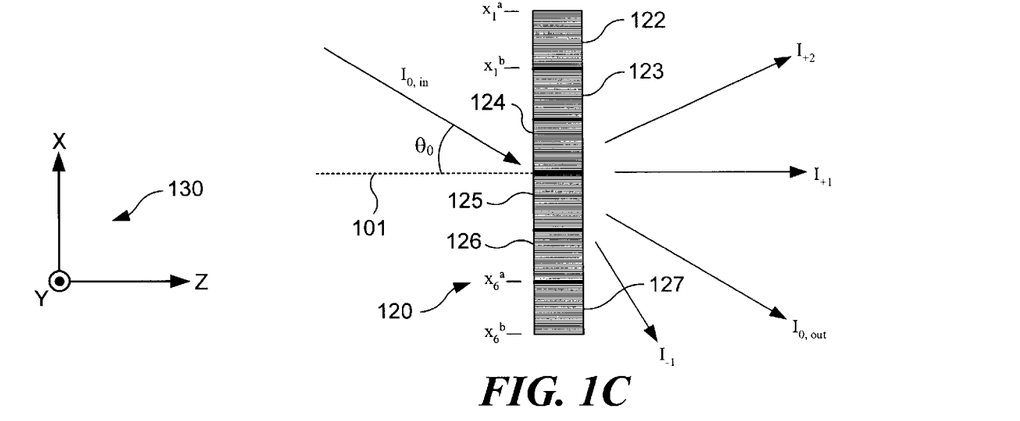
FIG. 1C is a schematic diagram illustrating diffraction of an input optical field by a segmented diffraction grating in accordance with an embodiment of the present invention.

With reference now primarily to FIG. 1C, a schematic diagram illustrating a segmented diffraction grating 120 is shown in accordance with an embodiment of the present invention. The segmented diffraction grating 120 illustrated in FIG. 1C will be used herein as a representative diffractive structure for illustrating embodiments of the characterization method, apparatus, and system of the present invention.

With continued reference to FIG. 1C, the segmented grating 120 may include, for example, N=6 spatially distinct subgratings 122, 123, 124, 125, 126, and 127 arrayed contiguously to define the grating 120. In other embodiments, the segmented gratings (e.g., the segmented grating 120) may include subgratings (e.g., 122–127) that are not contiguous. The subgratings 122–127 may include periodic arrays of diffractive structures such as grooves, refractive index variations, or other features, in various embodiments. The periodic arrays (and the grooves or other structures) may be configured to provide, for example, a constant spatial period for the subgratings 122–127 such that the relative phases of the diffractive structures for each of the subgratings 122–127 may be selected.

In one embodiment, relative subgrating amplitudes or amplitudes within one or more of the subgratings 122–127 may be selected. An optical thickness of each of the subgratings 122–127 may also be controlled by, for example, variation of substrate thickness, addition of phase masks, or other methods to provide additional control over the optical transfer function, in an embodiment. Variations of optical thickness within a selected subgrating or between subgratings (e.g., the subgratings 122–127) may be configured to control the relative phase of light directed from an input direction to an output direction. In one example, each of the subgratings 122–127 may have the same spatial period and grating profile, but with spatial phases such that there are discontinuities at segment boundaries.

As mentioned previously, embodiments of a method, apparatus, and system for measuring amplitude and phase provided by optical elements such as those identified above will be described herein with reference to segmented diffraction gratings. In a representative embodiment, a diffracted optical field may be produced by directing an incident optical field onto a segmented grating (or other optical element) at a selected diffraction angle. The incident optical field may be a uniform plane wave, a spherical wave, or other characterized or characterizable reference radiation pattern, in various embodiments. The diffracted optical field at the output of the grating (i.e., in the near field) may exhibit spatial variations in amplitude and phase in response to the optical properties of the grating and the incident optical field. By measuring the spatial variation in amplitude and phase in the near field, a near-field transmission or reflection function of the grating may be obtained, and grating parameters corresponding to amplitude and phase may be determined in accordance with an embodiment of the invention.

An amplitude component of a grating transfer function (or "transmission function" for a transmissive optical element) may be measured by, for example, placing a pinhole near the grating and then translating either the grating or the pinhole (or both) in a plane transverse to the propagation direction of the incident optical field. In one embodiment, and with reference to FIGS. 1A–1C, such translation may include movement in an XY-plane defined by a coordinate system 130, wherein translation comprises translation in a plane transverse to a surface normal of the optical element (indicated by the dashed line having reference numeral 101). By translating or scanning the pinhole, the transfer function amplitude may be measured in a selected output direction by placement of a photodetector, such as, for example, a photodiode, diode array, or charge-coupled device ("CCD"), or the like, in a path of the diffracted optical field. In addition, a lens, mirror, or other optical device may be positioned to increase the efficiency with which diffracted radiation is collected and directed to the photodetector, in an embodiment. It will be appreciated that reference herein to "transverse to the propagation direction of the incident optical field," or similar references is intended to refer to a plane lying across the propagation direction of the incident optical field, including a plane perpendicular to the propagation direction, as well as those planes lying at an angle to the propagation direction.

Figure 2A:
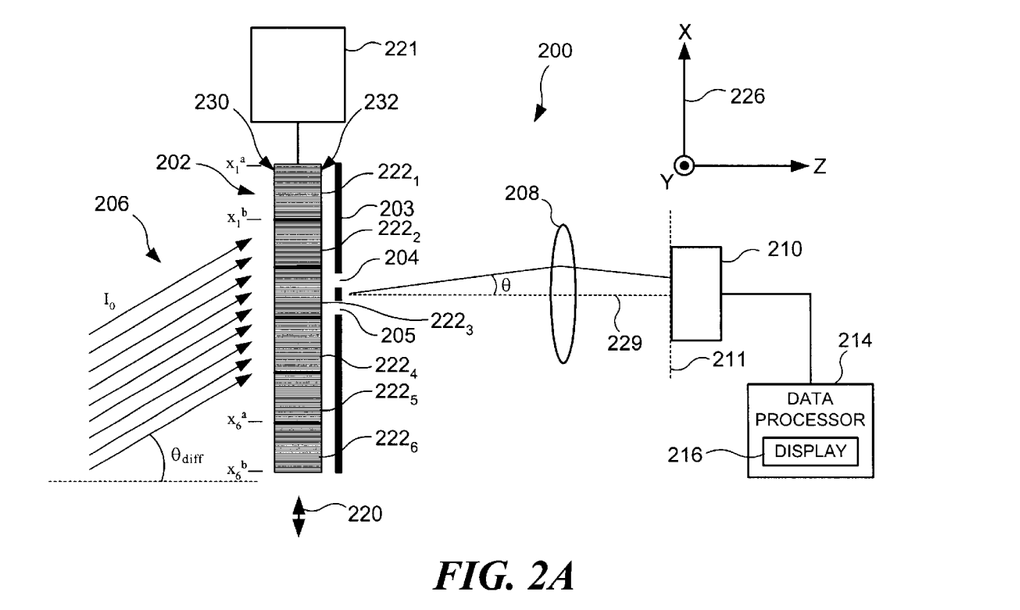
FIG. 2A is a schematic block diagram illustrating an embodiment of an apparatus to measure amplitude and phase contributions to an output optical field produced by directing an input optical field at an angle from normal to a segmented diffraction grating in accordance with an embodiment of the present invention.

With reference now primarily to FIG. 2A, an embodiment of an apparatus 200 configured to characterize or measure spatially dependent amplitude and phase contributions to an optical field incident on an optical element is shown in accordance with an embodiment of the present invention. The apparatus 200 may include, in an embodiment, a light source (not shown) to generate an optical field 206 incident to an optical element 202 such as a segmented grating, and an aperture plate 203, optically coupled to the light source, to define a pair of apertures 204, 205 (e.g., slits). In one embodiment, the incident optical field 206 (e.g., a laser beam from a 1 mW frequency stabilized He—Ne laser (not shown) at a wavelength λ=633 nm, or other light source) may be expanded, collimated, and directed onto the optical element 202 at an angle from normal to the optical element 202. A lens 208 may, in one embodiment, be optically coupled to the aperture plate 203 and positioned to receive optical radiation from the pair of slits 204, 205 and direct the radiation to a detector array 210, optically coupled to the aperture plate 203, and placed at a focal plane 211 of the lens 208. In one example embodiment, the pair of slits 204, 205 may be positioned approximately 5 mm behind the optical element 202. In embodiment, the lens 208 may be a plano-convex lens having a 1 m focal length. The lens 208 may be positioned to direct a first-order diffracted beam to the detector array 210, in an embodiment. The detector array 210 may be a HAMAMATSU S3903-256Q diode array that includes 256 detector elements having a pixel size of 25 $\mu$m by 500 $\mu$m, in an embodiment, and may be controlled via a HAMAMATSU 4070 driver amplifier board, for example. It will be appreciated that reference herein to "optically coupled" is intended to refer to a spatial position of an element relative to another element that allows light to be capable to pass there-between, without implying a physical connection, and without implying a requirement that light be passing there-between.

In one embodiment, an electronic signal corresponding to the radiation distribution at the detector array 210 may be communicated to a data processor 214 configured to store and analyze radiation distribution data. A display unit 216 may also be provided, in an embodiment. The data processor 214 may include, in one embodiment, a National Instruments AT-MIO-16XE10 data acquisition board and a computer such as a personal computer, or the like. Data acquisition, analysis, and data manipulation may be performed with NATIONAL INSTRUMENTS LABVIEW software using a LABVIEW program configured to determine a period and amplitude of the sinusoidal intensity pattern and the relative phase shifts of the pattern acquired by grating translation. The program and/or data may be stored on a hard disk, or provided on a floppy disk or CD-ROM or other computer readable media, in various embodiments.

In one embodiment, the incident optical field 206 (e.g., an approximate plane wave optical field) of intensity $I_o$ may be directed to the optical element 202 (e.g., a segmented grating). The optical element 202 may, in one embodiment, be positioned on a translation stage 221 and translated with respect to the slits 204, 205 along an axis 220 in a plane transverse to a surface normal of the optical element 202. The optical element 202 may include 6 contiguous segments $222_i$, for i=1, . . . 6 spanning respective intervals $x_i^b$–$x_i^a$, in an embodiment. In the illustrated embodiment, the diffractive structure of the optical element 202 is periodic along an x-axis 226. It will be appreciated that gratings or other optical elements having a greater or lesser number of segments may be included in various embodiments of the present invention.

The slits 204, 205 may be positioned near a front surface 230 or a back surface 232 of the optical element 202, in an embodiment. The output optical field produced by the slits 204, 205 and the optical element 202 may be recorded as a far-field intensity pattern at the detector array 210 while the optical element 202 is translated relative to the slits 204, 205, in an embodiment. An analysis of the radiation pattern received by the detector array 210 is discussed hereinafter with reference to the slits 204, 205. It will be appreciated that apertures of other shapes and/or configurations may be used in other embodiments of the invention, and that the analysis of such arrangements may be similar to the analysis corresponding to the pair of slits 204, 205, which is described hereinafter.

With continued reference to FIG. 2A, the incident optical field 206 of intensity $I_o$ may be incident at an angle $\theta_{diff}$ to the optical element 202 so that a portion of the optical field 206 that propagates through the optical element 202 and the slits 204, 205 is approximately perpendicular to the optical element 202. For example, in one embodiment the angle $\theta_{diff}$ may correspond to a diffraction angle of an $n^{th}$ diffraction order. Then lens 208 and photodetector array 210 may be configured to receive portions of the incident optical field that are diffracted at an angle θ with respect to an axis 229, in an embodiment. As illustrated in FIG. 2A, the optical field 206 may, for example, be directed to the optical element 202 at an angle associated with a diffraction order of the optical element 202 so that an appreciable portion of the optical field 206 exits the optical element 202 perpendicularly. The incident optical field 206 may be configured such that, in the absence of the aperture plate 203, a diffraction order of the optical element 202 propagates at an angle θ of about θ=0, in an embodiment.

While the arrangement illustrated in FIG. 2A may be convenient, other arrangements may also be suitable in other embodiments of the invention. For example, and with reference to FIG. 2B, a measurement system 231, illustrated as a schematic diagram, may be configured such that an incident optical field 233 of intensity $I_o$ may be perpendicularly incident to a segmented grating 234 (or other optical element) in accordance with an embodiment of the present invention. In one embodiment, the segmented grating 234 may include segments $250_1, \ldots, 250_6$, and produce an output optical field that propagates along an axis 260 at an angle $\theta_{out}$ with respect to the segmented grating 234, wherein $\theta_{out}$ corresponds to a diffraction angle of a diffraction order of the segmented grating 234.

Figure 2B:
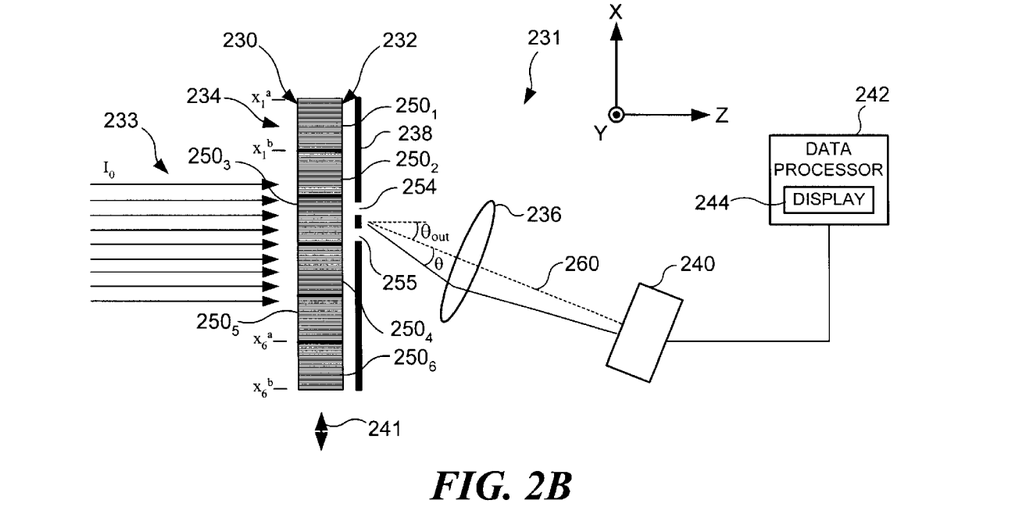
FIG. 2B is a schematic block diagram illustrating another embodiment of an apparatus to measure amplitude and phase contributions to an output optical field produced by directing an input optical field substantially perpendicularly to a segmented diffraction grating in accordance with an embodiment of the present invention.

In one embodiment, portions of the optical field 233 may be transmitted through apertures 254, 255 in an aperture plate 238 and may be directed by a lens 236 to an array detector 240 positioned at a focal plane of the lens 236. The array detector 240 may be communicatively coupled to a processor 242 (such as a personal computer) that may be provided with a display 244 configured to display diffraction data based on data received from the array detector 240, in an embodiment. It will be appreciated that the configuration illustrated in FIG. 2B is similar to that illustrated in FIG. 2A, but the system 231 of FIG. 2B is arranged with the incident optical field 233 perpendicular to the segmented grating 234 and a diffracted beam parallel to a direction of an output diffraction order. As described above in conjunction with FIG. 2A, in one embodiment the segmented grating 234 may be translated with respect to the slits 245, 255 along an axis 241 in a plane transverse to a surface normal of the segmented grating 234. It will be appreciated that other combinations of incident and output diffraction angles may be used for the measurements described above, in various embodiments.

In any of the arrangements illustrated in FIG. 2A, 2B, or 2C, the intensity pattern may be used to determine the spatial variation of the diffraction efficiency and phase via calculations based on the amplitude, phase, and periodicity of the intensity pattern as will be described hereinafter, in an embodiment. The relative phase shifts may be summed sequentially and plotted versus grating translation distance to provide a map of the optical phase of the diffracted light, and corresponding phases of the grating segments, in an embodiment. More complex mathematical treatment of the data may also be performed after acquisition.

Figure 3:
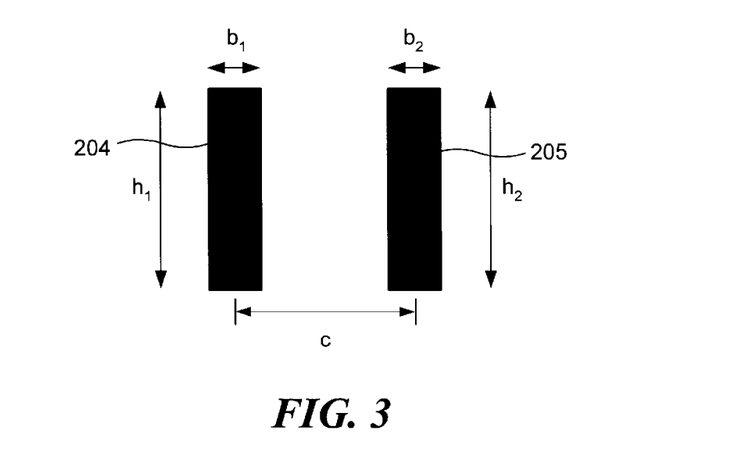
FIG. 3 is a schematic diagram illustrating a pair of slits in accordance with an embodiment of the present invention.

With reference now primarily to FIG. 3, a schematic diagram illustrating a pair of slits 204 and 205 is shown in accordance with an embodiment of the present invention. In one embodiment, the slits 204, 205 may have widths $b_1, b_2$ and lengths $h_1, h_2$, respectively, and may be separated by a distance c. The far-field intensity pattern produced by irradiating the slits 204, 205 may be a sinusoidal function with an envelope determined by the widths of the slits and a period determined by the spacing between the slits, in an embodiment. With continued reference to FIG. 3, assuming that the slits 204, 205 are very long ($h_1, h_2$ are large), the intensity pattern (I(k)) in the far field may be represented by the following relationship:

$$I(k) = I_0 \frac{\sin^2(kb/2)}{(kb/2)^2}[1 + m\cos(kc + \Delta\phi_{12})]$$

for $b=b_1=b_2$ and a slit separation c, wherein $I_o=I_1+I_2$ is a total intensity, $I_1$ and $I_2$ are intensities transmitted through slits 204 and 205, respectively, $k=(2\pi/\lambda)\sin\theta$, θ is the output angle shown in FIG. 2A, λ is a center wavelength of the incident optical field, m is a modulation index, and $\Delta\phi_{12}$ is a measured difference in phase between radiation transmitted through slits 204 and 205, in an embodiment. If an apparatus (e.g., the apparatus 200, FIG. 2A) is configured to use an nth diffraction order, the measured phase $\Delta\phi_{12}$ may be proportional to a product of the diffraction order n and a phase difference $\Delta\phi_G$, wherein $\Delta\phi_G$ corresponds to a phase difference on the optical element 202 (see, e.g., FIG. 2A). With continued reference to FIG. 2A, placement of the photodetector array 210 at the focal plane 211 of the lens 210 may produce a radiation pattern at the photodetector array 210 that corresponds to the far field diffraction pattern produced by the slits 204, 205, in an embodiment. The far field radiation pattern may correspond to the Fourier transform of the radiation pattern at the slits 204, 205.

The modulation depth m of the intensity pattern at the photodetector array 210 may depend on a ratio of the intensities of the light transmitted through the slits 204, 205, and typically $m=2(I_1/I_2)^{1/2}/(1+I_1/I_2)$. The total intensity $I_o$ may be proportional to the total light transmitted through both slits 204, 205, in an embodiment, and measurement of m and $I_o$ may permit estimation of relative diffraction efficiency. The phase of the sinusoidal intensity pattern may be related to phase differences between the light transmitted through the slits 204, 205, in an embodiment. Phase and amplitude contributions to the transmitted optical field (i.e., the output optical field) by the segmented grating (or other irradiated structure) determine the optical radiation pattern at the photodetector array 210. By scanning the segmented grating 202 (or other diffractive structure) with respect to the slits 204, 205, and recording the detected radiation pattern, phase differences between radiation at the slit 204 and the slit 205 may be obtained as a function of the position of the slits 204, 205 with respect to the segmented grating 202. Estimation or calculation of the phase transmission function may be accomplished using the intensity pattern (I(k)) equation set forth previously. The slit spacing c and slit widths $b_1, b_2$ may be selected, in one embodiment, to have convenient values, and may generally be selected based on dimensions of the photodetector array 210, the focal length of the lens 208, or spatial resolution to be produced by the measurement.

The apparatus 200 may provide, in one embodiment, amplitude and/or phase measurements based on interference of radiation from the slits 204, 205. The apparatus 200 need not include special vibration isolation or precise control of other environmental variables because the interfering optical fields originate at the same structure (e.g., the segmented grating 202), and, for example, lateral or transverse vibrations of the structure tend to produce similar variations in the fields transmitted by each of the slits 204, 205. These variations tend to compensate each other in the resulting interference pattern. In addition, the optical fields from each slit (e.g., slits 204, 205) propagate through a similar environment so that, for example, air turbulence does not significantly contribute to phase differences between the interfering beams. Because the interference pattern at the photodetector array (e.g., the detector array 210, FIG. 2A) may be relatively insensitive to mechanical and environmental instabilities, detection of the interference pattern may occur over a long time period of time without accumulation of additional phase or amplitude noise. In addition, the apparatus 200 may provide a convenient mechanism for measuring amplitude and/or phase contributions of an optical element to an optical field because a separate reference radiation field need not be provided.

Figure 4A:
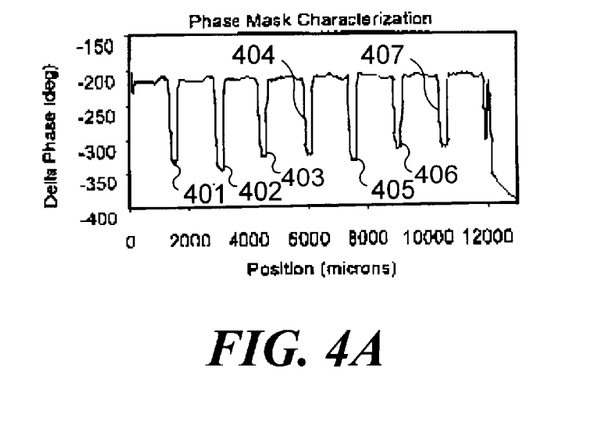
FIG. 4A is a graph illustrating a phase difference as a function of position for an example segmented transmission grating having 8 segments based on data obtained using an apparatus, like that illustrated in FIG. 2A, in accordance with an embodiment of the present invention.
Figure 4B:
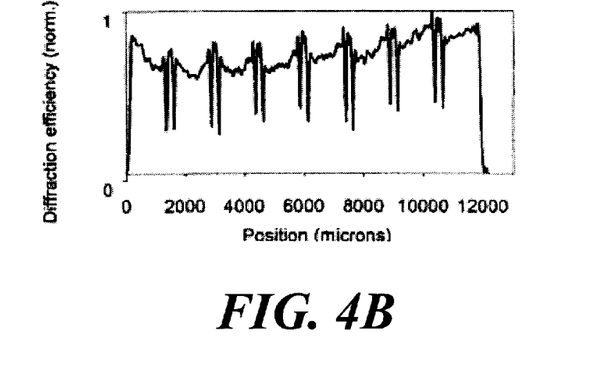
FIG. 4B is a graph illustrating diffraction efficiency as a function of position for an example segmented transmission grating having 8 segments based on data obtained using an apparatus, like that illustrated in FIG. 2A, in accordance with an embodiment of the present invention.
Figure 4C:
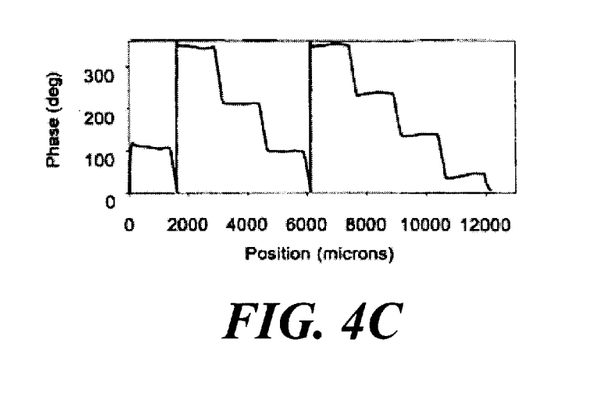
FIG. 4C is a graph illustrating phase as a function of position for an example segmented transmission grating having 8 segments based on data obtained using an apparatus, like that illustrated in FIG. 2A, in accordance with an embodiment of the present invention.

With reference now primarily to FIGS. 4A–4C, graphs illustrating relative phase, diffraction efficiency, and reconstructed phase, respectively, as functions of position for a segmented diffraction grating (see, e.g., the grating 202, FIG. 2A) having 8 contiguous sections with phase shifts between adjacent segments are shown in accordance with an embodiment of the present invention. In one embodiment, each segment may have a groove period of about 3 $\mu$m and a width of about 0.5 mm, and total grating length may be about 12 mm. In one embodiment, the apparatus 200 illustrated in FIG. 2A may be used to acquire phase and amplitude data using slits 204, 205 with widths of about 50 $\mu$m, and a separation of about 1.5 mm.

The data used to produce the graphs illustrated in FIGS. 4A–4C may be obtained by scanning a grating (e.g., the optical element 202, FIG. 2A) with the slits (e.g., the slits 204, 205, FIG. 2A) fixed. With reference first to FIG. 4A, the relative phase shifts between the various grating segments may be apparent as a series of phase excursions 401, 402, 403, 404, 405, 406, and 407, each having an approximate magnitude of 120 degrees, in an embodiment. The graph illustrated in FIG. 4C shows phase relative to a reference phase of 0 degrees at an initial position (0 $\mu$m) at an end of the grating (e.g., the grating 202, FIG. 2A). For the particular example measurements used to obtain the data and produce the graphs illustrated in FIGS. 4A–4C, the grating was designed to have phase shifts of 120 degrees between adjacent segments, as illustrated in FIGS. 4A–4C.

The accuracy and resolution of embodiments of the method, apparatus, and system of the present invention as described herein may depend on several factors including laser noise (or noise in other incident optical field), noise in the detector array, and parameters such as slit width and slit separation, in an embodiment. Generally, there may be a tradeoff between spatial resolution and phase accuracy. For example, a smaller slit separation may provide better spatial resolution at the expense of accuracy, while a larger slit spacing may provide better phase accuracy at the expense of spatial resolution. Choice of slit width and slit separation may depend on intended spatial resolution and phase accuracy, in an embodiment, as well as the optical imaging and detection system such as the lens 208 and the photodetector array 210.

In one embodiment, the resolution of a phase measurement may be increased, without changing the slit widths, by recording relative phases across the grating at spatial intervals equal to the slit width and concatenating these measured phase differences. In this way, information about phase variations between the slits may be obtained. However, due to a lack of measured data over the portion of the grating where the scan begins—a distance equal to the slit separation—there may be some uncertainty in the spatial phase that may cause an offset error in the reconstructed phase profile. The magnitude of the error may depend on the actual phase profile over the region of uncertainty. In one embodiment, if the measured phase profile is reasonably smooth, then the measured phase data may be extrapolated into this region with only a small loss in accuracy. In addition, if there is some knowledge (obtained by some other method) about the phase and/or amplitude profile of the grating over any region or regions equal in length to approximately the slit separation, then the method described above may be used to reconstruct the phase and/or amplitude over the entire length of the grating, in an embodiment.

Figure 2C:
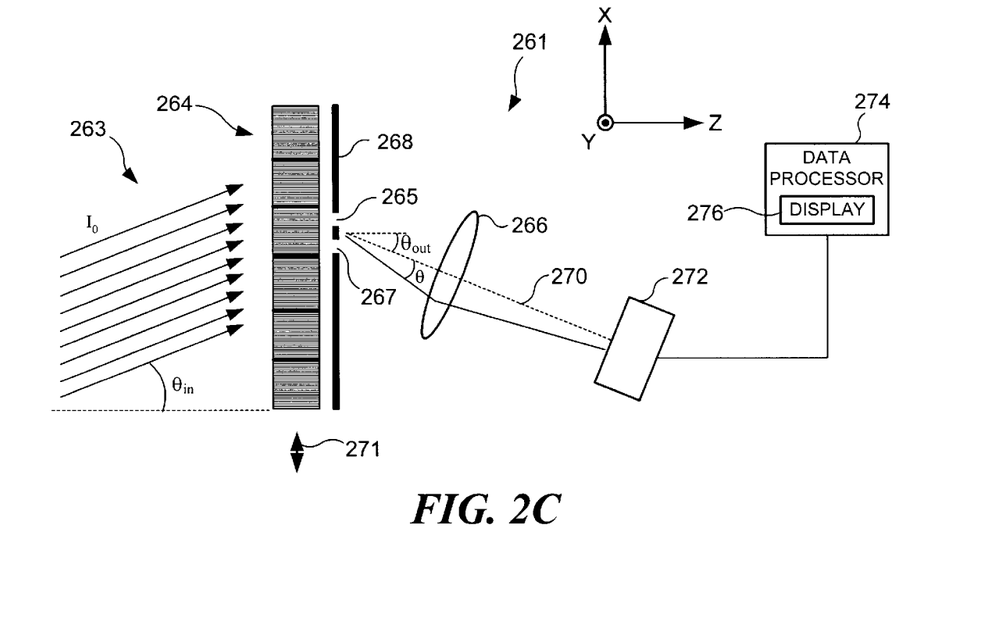
FIG. 2C is a schematic block diagram illustrating yet another embodiment of an apparatus to measure amplitude and phase contributions to an output optical field produced by directing an input optical field at a first angle from normal to a segmented grating to cause the output optical field to travel at a second angle from normal wherein a sine of the first angle is substantially equal to a sine of the second angle in accordance with an embodiment of the present invention.

Accuracy of phase measurements obtained with the apparatus 200, 231, and/or 261 illustrated in FIGS. 2A, 2B, and 2C, respectively, may be dependent on the linearity of the translations along the axes 220, 241, 271, respectively, in an embodiment. For example, with reference to the apparatus 200, angular motion of the translation stage 221 produced during translation along the axis 220 may produce changes in angle of incidence and diffraction. Such changes typically produce angular deviations of the diffraction pattern produced by the slits 204, 205. This angular deviation may produce an apparent phase shift between the slits 204, 205 that does not correspond to phase shifts produced by the segmented grating 202. If determinations of phase shifts do not compensate or correct for the effects of angular deviations produced by the translation stage 221, then the measured phase shifts may include these apparent phase shifts.

In some applications, removal of the apparent phase shifts may be undertaken. In one embodiment, minimizing or reducing the effect of stage errors may include independently measuring phase shifts produced by stage errors to obtain a phase correction that may be used in conjunction with the intensity pattern (I(k)) equation set forth above. In another embodiment, and with reference now primarily to FIG. 2C, compensating for stage errors may include configuring an apparatus 261 to reduce contributions to phase measurements produced by stage errors. For example, an input optical field 263 may be configured so that $\sin(\theta_{in}) = \sin(\theta_{out}) = (n\lambda)/(2\Lambda)$, where $\theta_{in}$ and $\theta_{out}$ are input and output diffraction angles, respectively, measured with respect to the grating normal, n is the diffraction order, $\lambda$ is the wavelength of input light, and $\Lambda$ is the grating period. In other words, in one embodiment, the optical field 263 may be incident to an optical element 264 at a first angle from normal (e.g., $\theta_{in}$) to cause the output optical field to travel at a second angle from normal (e.g., $\theta_{out}$), within a range of angles $\theta$, wherein a sine of the first angle is substantially equal to a sine of the second angle. This configuration, which is known in the art as the minimum deviation angle, may exhibit reduced deviation of the angle of the diffracted beam with respect to the slits for small angular deviations of the input optical field with respect to the grating, in an embodiment. In a particular example, with $\lambda=633$ nm, $\Lambda=3$ $\mu$m, $|n|=1$, then $\theta_{in}=\theta_{out}=\pm 6.06$ degrees for n=1. In this configuration, an angular deviation of about 1 degree changes the output angle by less than 0.0002 degrees. In comparison, a 1 degree deviation of the grating with normal incidence ($\theta_{in}=0$ degrees) of the input optical field produces an angular deviation of about 0.025 degrees from the diffracted beam.

In one embodiment, translation of the optical element 264 along an axis 271 relative to an aperture plate 268 having a pair of apertures 265, 267 may produce the output optical field that may then be collected and focused via a lens 266 along an axis 270 to a photodetector array 272 to provide an input to a data processor 274 and display 276, as discussed previously.

For measurements with the apparatus 231 illustrated in FIG. 2B, the analysis may be modified to include effects caused by the non-orthogonality of the aperture plate 238 and the axis 260. In one embodiment, such modifications may include using projections of slitwidths and slit spacing onto a plane perpendicular to the axis 260. If apertures or sets of apertures other than two slits are used, then similar diffraction calculations may be performed based on such apertures, in an embodiment. In addition, the phase term $\Delta\phi_{12}$ may include contributions based on a selected diffraction order, in one embodiment. For example, aligning the input optical field 206 (see, e.g., FIG. 2A) such that $\theta_{diff}$ corresponds to an $n^{th}$ diffraction order may produce a corresponding contribution to $\Delta\phi_{12}$.

Embodiments of the optical phase and amplitude characterization method, apparatus, and system of the invention have been described herein with reference to transmission diffraction gratings. However, it will be appreciated that other embodiments of the method, apparatus, and system of the invention may be readily modified for reflective diffractive structures. For such structures, the input optical field may be incident on the same side of the grating as the output optical field, which may present some constraints on placement of the slits with respect to the grating surface, especially for small diffraction angles. However, it will be appreciated that modification of the apparatus illustrated in FIGS. 2A, 2B, and 2C for amplitude and phase measurements of reflective gratings may be readily undertaken. For example, using an optical spot size (e.g., a laser beam width) that is only slightly larger than the slit separation, and placing the slits a distance from the grating such that the incident light is not blocked by the slits, permits such measurements. The minimum slit-grating distance d depends on the slit separation c, the slit width b, and the diffraction angle, $\theta$, wherein $d>(c+2b)/\tan \theta$. In one embodiment, the minimum d may be approximately 2–5 mm. By performing measurements using a second (or a higher) diffraction order, the diffraction angle may be increased and slits may be placed even closer to the grating.

In the case where it is desirable to minimize the effect of stage errors in the characterization of reflective gratings, it is possible to use a minimum deviation configuration similar to that described for transmission gratings. This configuration, known in the art for reflection gratings as the Littrow condition, results in reduced sensitivity in the phase measurement to stage errors. In the Littrow configuration, the reflected beam counter propagates with the incident beam and thus must be separated using a beam splitter or equivalent device. This places an additional constraint on the proximity of the slits to the grating but should not cause a significant reduction in the accuracy of the measurement. With the exception of these minor modifications, the procedures and analyses for the amplitude and phase characterization of reflective gratings are generally similar to those corresponding to transmission gratings, as described above.

It will be appreciated that examples given throughout the foregoing description may be modified in arrangement and detail in various embodiments of the invention. For example, apertures other than slits may be used in one embodiment, and three or more slits or apertures may be used in one embodiment of the invention. Coherent or incoherent light sources may also be used in an embodiment, and may either be narrowband or broadband, and may produce radiation at visible or invisible wavelengths in various embodiments.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. An apparatus, comprising:
   a light source to generate an optical field incident to an optical element;
   an aperture plate, optically coupled to the light source, to define at least two apertures, the aperture plate positioned relative to the optical element to permit translation of at least one of the optical element or the aperture plate in a plane transverse to a surface normal of the optical element; and
   a photodetector, optically coupled to the aperture plate, to detect an output optical field, the output optical field having a spatially dependant amplitude and phase related to the optical element and to the optical field incident to the optical element.

2. The apparatus of claim 1, further comprising a lens, optically coupled to the aperture plate, to receive the output optical field and to direct the output optical field to the photodetector, the photodetector positioned at a focal plane of the lens.

3. The apparatus of claim 1, wherein the aperture plate is positioned near a front surface of the optical element.

4. The apparatus of claim 1, wherein the aperture plate is positioned near a back surface of the optical element.

5. The apparatus of claim 1, wherein the photodetector comprises a photodetector selected from a group including a photodiode, a diode array, and a charge-coupled device.

6. The apparatus of claim 1, wherein the at least two apertures comprise slits.

7. The apparatus of claim 1, wherein the optical element comprises a transmission diffraction grating.

8. The apparatus of claim 1, wherein the optical element comprises a reflective diffraction grating.

9. The apparatus of claim 1, wherein the optical field is incident to the optical element at an angle from normal, the angle corresponding to a diffraction angle of a diffraction order.

10. The apparatus of claim 1, wherein the optical field is incident to the optical element substantially perpendicularly.

11. The apparatus of claim 1, wherein the optical field is incident to the optical element at a first angle from normal to cause the output optical field to travel at a second angle from normal, a sine of the first angle being substantially equal to a sine of the second angle.

12. A method, comprising:
    positioning an aperture plate relative to an optical element to permit translation of at least one of the optical element or the aperture plate in a plane transverse to a surface normal of the optical element, the aperture plate defining at least two apertures;
    directing the incident optical field onto the optical element;
    translating the at least one of the optical element or the aperture plate in the plane transverse to the surface normal of the optical element to generate an output optical field, the output optical field having an amplitude and phase related to at least one spatial position on the optical element; and
    detecting the output optical field.

13. The method of claim 12, wherein positioning the aperture plate relative to the optical element comprises positioning the aperture plate near a front surface of the optical element.

14. The method of claim 12, wherein positioning the aperture plate relative to the optical element comprises positioning the aperture plate near a back surface of the optical element.

15. The method of claim 12, wherein translating the at least one of the optical element or the aperture plate in the plane transverse to the surface normal of the optical element comprises translating the optical element along an axis to generate the output optical field as a function of position of the at least two apertures with respect to the optical element.

16. The method of claim 12, further comprising analyzing a signal generated in response to detection of the output optical field to determine a period and relative phase shifts of an intensity pattern corresponding to the at least one spatial position on the optical element.

17. The method of claim 12, wherein directing the incident optical field onto the optical element comprises directing the incident optical field at an angle from normal, the angle corresponding to a diffraction angle of a diffraction order.

18. The method of claim 12, wherein directing the incident optical field onto the optical element comprises directing the incident optical field substantially perpendicularly to the optical element.

19. The method of claim 12, wherein directing the incident optical field onto the optical element comprises directing the incident optical field at a first angle from normal to cause the output optical field to travel at a second angle from normal, a sine of the first angle being substantially equal to a sine of the second angle.

20. A system, comprising:
   a light source to generate an optical field incident to an optical element;
   an aperture plate, optically coupled to the light source, to define at least two apertures, the aperture plate positioned relative to the optical element to permit translation of at least one of the optical element or the aperture plate in a plane transverse to a surface normal of the optical element;
   a photodetector, optically coupled to the aperture plate, to detect an output optical field, the output optical field having a spatially dependant amplitude and phase related to the optical element and to the optical field incident to the optical element; and
   a data processor, communicatively coupled to the photodetector, to analyze the output optical field detected by the photodetector to determine at least one of a period, an amplitude, or a relative phase shift of an intensity pattern corresponding to a varying spatial position on the optical element.

21. The system of claim 20, further comprising a lens, optically coupled to the aperture plate, to receive the output optical field and to direct the output optical field to the photodetector, the photodetector positioned at a focal plane of the lens.

22. The system of claim 20, wherein the aperture plate is positioned near a front surface of the optical element.

23. The system of claim 20, wherein the aperture plate is positioned near a back surface of the optical element.

24. The system of claim 20, wherein the at least two apertures comprises slits.

25. The system of claim 20, wherein the optical element comprises a transmission diffraction grating.

26. The system of claim 20, wherein the optical element comprises a reflective diffraction grating.

27. The system of claim 20, wherein the optical field is incident to the optical element at an angle from normal, the angle corresponding to a diffraction angle of a diffraction order.

28. The system of claim 20, wherein the optical field is incident to the optical element substantially perpendicularly.

29. The system of claim 20, wherein the optical field is incident to the optical element at a first angle from normal to cause the output optical field to travel at a second angle from normal, a sine of the first angle being substantially equal to a sine of the second angle.

* * * * *